United States Patent [19]

Thurman

[11] 4,151,864
[45] May 1, 1979

[54] DRAIN ADAPTER FOR CORRUGATED HOSE

[75] Inventor: Erven W. Thurman, St. Louis, Mo.

[73] Assignee: Arundale, Inc., St. Louis, Mo.

[21] Appl. No.: 834,317

[22] Filed: Sep. 19, 1977

Related U.S. Application Data

[63] Continuation of Ser. No. 563,609, Mar. 31, 1975, abandoned.

[51] Int. Cl.² ............................ F16L 3/02; F16L 57/00
[52] U.S. Cl. ..................................... 138/106; 138/110; 138/121; 248/79; 285/157; 285/175
[58] Field of Search ............................................. 4/1-5, 4/DIG. 7; 68/208; 137/387, 360; 138/106, 107, 109, 110, 113, 121, 178, 120; 141/299; 248/51, 54 R, 62, 73, 74 B, 65, 75, 79; 285/61, 64, 157, 175, DIG. 4

[56] References Cited

U.S. PATENT DOCUMENTS

| | | | |
|---|---|---|---|
| 1,156,145 | 10/1915 | Jenkins | 138/110 X |
| 3,810,490 | 5/1974 | Ludwick | 138/106 |
| 3,860,978 | 1/1975 | Wirth | 138/106 X |

Primary Examiner—Richard E. Aegerter
Assistant Examiner—Frederick R. Schmidt
Attorney, Agent, or Firm—Richard J. Sher

[57] ABSTRACT

An adapter for connecting a corrugated hose, e.g., a washing machine drain hose, to a standpipe has an elongated tube with a bell at one end for holding and retaining the corrugated hose. A curved support extends from the bell end of the tube and selectively supports the hose in a desired curve of from 0° to 180°. A sliding annular retainer ring slides on the curved support and selectively locks the corrugated hose in the chosen position. Outwardly extending ears on the end of the curved support hold the retainer ring on the adapter. The tube has longitudinal ribs over at least a portion of its length. The ribs provide additional strength and tapered portions on the ribs prevent the tube from jamming in a standpipe and provide for easy release. The ribs have enough friction to retain the tube in the standpipe in cooperation with the weight of the assembly and the water therein to prevent the hose from being forced from the standpipe by the jet effect of water moving therethrough.

6 Claims, 8 Drawing Figures

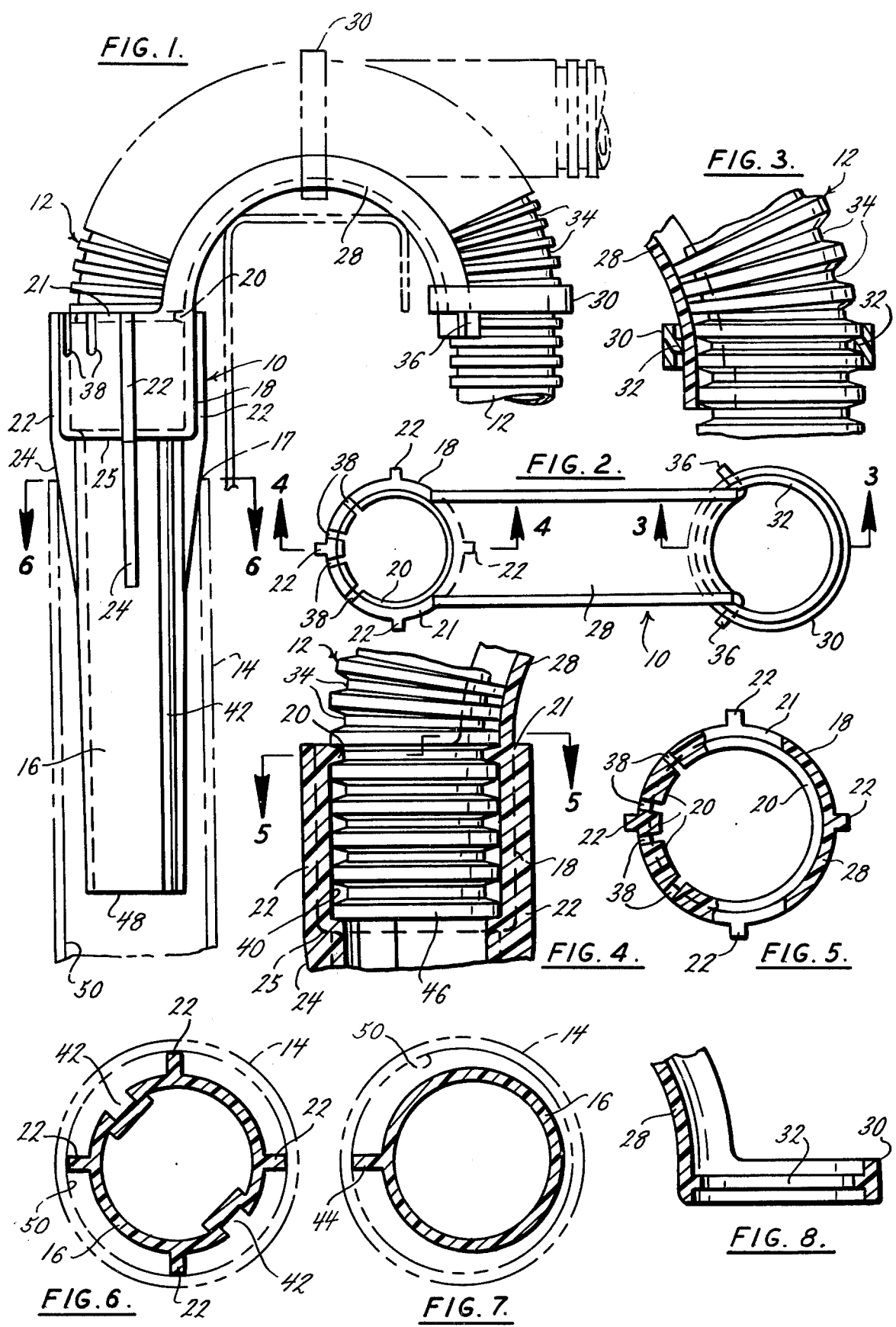

DRAIN ADAPTER FOR CORRUGATED HOSE

This is a continuation of application Ser. No. 563,609 filed Mar. 31, 1975, now abandoned.

BACKGROUND AND SUMMARY OF THE INVENTION

Drain hose for automatic washing machines and similar devices has previously been made of heavy rubber or neoprene tubing having a rigid 90° or 180° bend in the end of the tubing or having a bent piece of metal tubing inserted in the end of the tubing. The bent portion is inserted in a standpipe to provide an outlet for discharged water. This arrangement has some drawbacks. The heavy rubber or neoprene tubing is expensive and the smooth surface of the neoprene, or the metal, does not maintain firm contact between the drain tubing and the standpipe. As a result, vibration and the water jet action during draining of the machine may lift the tubing out of the standpipe causing the water ejected therefrom to be spread on the basement floor of the user or in the area of use of the machine instead of allowing it to be piped into the sewer.

Recently, molded and extruded corrugated hose has come into use. This hose is made of semi-rigid or flexible plastic and is less expensive than the heavy neoprene hoses. The tubing does not have a permanent bend formed at its exit end, but is normally held in a 180° arc by a wire retainer. The loose end of the hose is inserted into the standpipe. This arrangement also has a number of drawbacks. There is no provision for retaining the hose in the top of the standpipe under the influence of water thrust and vibration during pumping of the water from the machine. In addition the softer flexible hose can be readily damaged from friction which occurs as a result of vibration and movement of the hose in the standpipe. As a result, the hose is often gradually abraded away or crushed.

In small standpipes it may be necessary to cram the corrugated hose forcefully into the top of the standpipe with the result that there is a seal around the upper edge. This is a drawback from a number of standpoints, particularly since it does not allow water on the outside of the hose to drain into the standpipe. This arrangement can also create a siphon effect under some circumstances and water may be drawn through the drain back into the machine.

The standard wire adapter provides no means by which the shape of the bend in the hose can be changed, e.g., from a 180° to a 90° bend, as desired and as the circumstances require.

Applicant has produced an adapter which can readily change the shape of the bend in a corrugated hose from any curvature from a 0° to a 180° position, as desired. The adapter will fit standard molded or extruded corrugated hose, will retain the end of the hose in the adapter and protect the hose from abrasion and crushing, will retain the hose in the standpipe under the influence of vibration and water thrust. The adapter has a wedge fit which provides an adequately tight fit but does not allow the adapter to jam into a standpipe so that it is difficult to withdraw. The adapter is provided with an anti-siphon which allows air to pass between the interior of the standpipe and the exterior of the adapter. The anti-siphon prevents water from the drain or sewer being drawn back into the machine. The air passage also minimizes back pressure caused by air trapped in the drain during expulsion of water into the drain.

DESCRIPTION OF THE DRAWINGS

FIG. 1 is a front elevational view of an embodiment of hose adapter and holder of the invention and a cooperating hose;

FIG. 2 is a top view of the hose adapter of FIG. 1;

FIG. 3 is a partial cross-sectional view of the hose adapter taken along the plane of line 3—3 in FIG. 2;

FIG. 4 is a partial cross-sectional view of the hose adapter taken along the plane of line 4—4 in FIG. 2;

FIG. 5 is a cross-sectional view taken along the plane of line 5—5 in FIG. 4;

FIG. 6 is a cross-sectional view taken along the plane of line 6—6 in FIG. 1;

FIG. 7 is an alternative embodiment shown in a view similar to FIG. 6; and

FIG. 8 is an alternative embodiment having a fixed retainer ring shown in a view similar to FIG. 3.

DESCRIPTION OF THE PREFERRED EMBODIMENTS

The adapter of the invention enables one to use flexible and semi-rigid molded and extruded corrugated tubing as drain tubing from devices such as automatic washing machines without the handicaps of previous devices. The conventional corrugated hose may be used with this device. The adapter is preferably made of molded polypropylene but can be made from high density polyethylene, polyvinyl chloride, ABS, or any similar moldable materials. Typically, the device will be made by injection molding.

The device consists of a tube having a bell at the top in which the corrugated tubing is pressed and retained, either by friction or by a positive lock. Extending outwardly from the bell is an arcuate member which is adapted to lie closely adjacent to and support the corrugated tubing. This support is normally made in the shape of an arc, roughly corresponding to a portion of the circumference of the corrugated tubing, for example, a 120° arc. The adapter tube can have reinforcing means along its length, anti-jam devices to prevent jamming in a standpipe and may have a snap fitting detent means to lock the corrugated hose in place. The device may be made either in a permanent configuration such as a permanent 90° or 180° form, adapted to selectively retain a corrugated hose in an arc of from 0° to 180° or more.

Referring in more detail to the drawings, FIG. 1 shows an embodiment of the device adapted to retain a corrugated hose selectively in an arc of from about 0° to about 180°. The 90° and 180° positions are shown. In FIG. 1, the tube adapter 10 of the invention holds a corrugated hose 12 in fluid flow communication with a standpipe 14 by having the barrel 16 of the tubular adapter 10 inserted in the open end 17 in the standpipe 14. A bell 18 is formed on one end of the tubular adapter 10, as shown. Bell 18 is adapted to receive and retain the corrugated hose 12. As shown in FIGS. 1, 2, 4 and 5, the corrugated hose is retained by an annular detent 20 in the end 21 of bell 18.

A plurality of longitudinal reinforcing ribs 22 are spaced about the outer surface of the bell 18 and extend along the axis of the tube barrel 16. The portions of the ribs 22 which are remote from the end 21 of bell 18 are formed into a wedge 24. This wedge 24 allows the tubular adapter 10 to be inserted into standpipes of a variety of inner diameters without jamming in the standpipes. The ribs 22 prevent the base 25 of bell 18 from tightly engaging a standpipe and forming a seal around the base 25 of bell 18.

Extending transversely from the longitudinal axis of the tubular adapter 10 and attached to the upper edge 21 of the bell 18 is a hose supporting member 28 extending outwardly from the upper edge 21 of bell 18. Hose supporting member 28 is in an approximate 180° arc and is adapted to lie underneath and support a corrugated hose when retained in the bell 18. The cross-section of hose supporting member 28 is an arc having a radius roughly equivalent to that of the corrugated hose. The arc of hose supporting member 28 is approximately 120°. A retainer ring 30 slides along the length of hose supporting member 28. Retainer ring 30 is used to selectively fix in place a hose in a preselected arc. Retainer ring 30 has an annular detent 32 on the inner circumference of retainer ring 30. The detent 32 is adapted to engage in the valleys 34 of the corrugations in the corrugated hose 12. When a hose is not in place retainer ring 30 is held on the tubular adapter by outwardly extending ears 36 which are molded at the end of the hose supporting member 28, Crenelations 38, shown in FIG. 1, extend downward from the upper edge 21 of bell 18. Crenelations 38 give some flexibility to the upper edge 21 of bell 18 and facilitate snapping of the corrugated hose 12 into the bell 18 and retention of the corrugated hose 12 in the bell 18 by detents 20. It is understood of course that a solid bell construction could be used or that a construction having no detents could be used, wherein the corrugated hose was retained in the bell by friction from a hand or machine force fit. If a force fit is used, the wall 40 of bell 18 may be given an inward taper.

The tubular adapter had longitudinal recesses 42 extending along its length. These recesses 42 prevent the tubular adapter from being forced into a sealing contact with the standpipe 14. Passages 42 allow air to pass outwardly around the tubular adapter 10, preventing back pressure from building up in the standpipe 14, making the pumping of fluids from the machine much more difficult. Passages 42 also prevent a change in pressure from creating a siphon effect which would pull discharged water back through the standpipe and corrugated hose into the machine.

FIG. 7 shows a modification of the anti-siphon and anti-seal means shown in FIG. 6. The structure shown in FIG. 7 uses a longitudinal rib 44 which extend along the entire length of the tubular adapter 10 parallel to its major axis, one or more ribs may be used.

It is also possible to make an embodiment of the device in which the retainer ring 30 is fixed in place, e.g., either for a 90° arc or an 180° arc. Such a modification is shown in FIG. 8. In FIG. 8, the retainer ring 30 is molded at the extreme end of hose supporting member 28 to support a hose in a 180° arc.

In use the adapter 10 has a semi-rigid or flexible corrugated hose 12 placed through the retainer ring 30 with the free end 46 forced into bell 18 and retained therein either by frictional engagement with the interior surface of bell 18 and/or by engaging detents 20 in the valleys 34 of the corrugations in the corrugated hose 12. The hose 12 is bent over hose support member 28 in either a 180° arc, a 90° arc, or such other intermediate arc between 0 and 180° as is desired, and the retainer ring 30 is moved to the portion of the arcuate hose supporting member 28 desired and clamped in place by engaging detent 32 and the valleys 34 of the corrugations in the corrugated hose 12. The exit end 48 of the tubular adapter 10 may then be positioned in a standpipe 14 with the wedge portions 24 of longitudinal ribs 22 engaging the inner surface 50 of the standpipe 14 with enough frictional contact to prevent removal of the corrugated hose 12 and tubular adapter 10 combination from the standpipe by vibration and by the thrust effect of water passing through the hose 12 and adapter 10. The wedge shaped portions 24 prevent the tubular adapter 10 from jamming tightly in the standpipe 14 so that it cannot be easily removed by hand.

It will be apparent to those skilled in the art that many modifications of the device disclosed may be made without departing from the spirit of the invention. It is intended that applicant not be bound by the embodiments disclosed herein for purposes of illustration, but is to be limited only by the scope of the appended claims.

What is claimed is:

1. An adapter for protecting and holding the end of flexible hose comprising an elongated tube having an enlarged bell at one end, said bell having means to receive a hose therein, means in said bell for retaining a hose therein in opposition to a force tending to disengage said bell and the hose, downwardly tapering, spaced, longitudinal ribs on the exterior surface of said tube, said ribs acting as inclined antijamming means and recessed areas between said ribs acting as antisiphon means, a hose support means extending outwardly from said tube at a location adjacent to said bell and adapted to support the hose when received in said bell, and cooperating means on said hose support means to fix the hose in a predetermined arc.

2. The adapter of claim 1 wherein said support means includes means for selectively fixing the hose in any of a plurality of predetermined arcs.

3. An adapter for protecting and holding the end of a flexible hose comprising an elongated tube having an enlarged bell at one end, the bell having crenelations at its upper edge, the bell having means to receive a hose therein, means in the bell to retain a hose therein in opposition to a force tending to disengage the bell and the hose, and longitudinal circumferentially spaced ribs on the exterior surface of the tube to reinforce at least a portion of the tube, the spaced ribs having recessed areas between the ribs, said ribs being inclined along the length thereof and being adapted to provide antijamming contacting structures, a hose support means extending outwardly from the tube at a location adjacent to the bell to support a hose when received in the bell and cooperating means on the hose support means to fix the hose in a predetermined arc.

4. An adapter for protecting and holding the end of a flexible hose comprising an elongated tube having an enlarged bell at one end, the bell having crenelations at its upper edge, the bell having means to receive a hose therein in opposition to a force tending to disengage the bell and the hose, and longitudinal circumferentially spaced ribs on the exterior surface of the tube to reinforce at least a portion of the tube, the spaced ribs having recessed areas between the ribs providing spaced anti-siphon passages between the ribs, the ribs being inclined along the length thereof and being adapted to provide anti-jamming contacting structures, a hose support means extending outwardly from the tube at a location adjacent to the bell to support a hose when received in the bell and cooperating means on the hose support means to fix the hose in a predetermined arc, the means to fix the hose in a predetermined arc being a ring concentric to the major axis of the hose support means having means to receive a hose therethrough and having detent means on the inner surface of the ring to engage the hose and hold it fixed at a preselected location on the support means.

5. An adapter for protecting and holding the end of flexible hose comprising an elongated tube having an enlarged ball at one end, the bell having crenelations at its upper edge, the bell having means to receive a hose therein, means in the bell to retain a hose wherein in opposition to a force tending to disengage the bell and the hose, and longitudinal spaced ribs on the exterior surface of the tube to reinforce at least a portion of the tube, the spaced ribs having recessed areas between the ribs providing spaced anti-siphon passages, the ribs being inclined along the length thereof and being adapted to provide anti-jamming contacting structures, a hose support means extending outwardly from the tube at a location adjacent to the bell to support a hose when received in the bell, and cooperating means on the hose support means to fix the hose in a predetermined arc, the means to fix the hose in a predetermined arc being a ring concentric to the major axis of the hose support means; the ring having means to move freely along the hose support means, having means to receive a hose therethrough and having detent means on the inner surface of the ring to engage the hose and hold it fixed at a preselected location on the support means.

6. An adapter for protecting and holding the end of a flexible hose comprising an elongated tube having an enlarged bell at one end, the bell having crenelations at its upper edge and being adapted to receive a hose therein, means in said bell to retain a hose therein in opposition to a force tending to disengage the bell and the hose, longitudinal ribs on the exterior surface of the tube to reinforce at least a portion of the tube, the ribs being inclined over at least a portion thereof to provide an anti-jamming effect when the adapter is inserted into a pipe or drain and the ribs being circumferentially spaced on the tube and having recesses therebetween to provide an anti-siphon effect when the tube is inserted into a pipe or drain, a hose support means extending outwardly from the tube at a location adjacent to the bell, and being adapted to support a hose when received in the bell, and cooperating means on the hose support means to fix the hose in a predetermined arc.

* * * * *